3,483,371
DISTANCE MEASURING BETWEEN TWO POINTS BY THE USE OF PENETRATIVE RADIATION
Robert E. Canup and Ralph H. Clinard, Jr., Richmond, Va., assignors to Texaco Experiment Incorporated, Richmond, Va., a corporation of Virginia
Filed Dec. 31, 1963, Ser. No. 334,717
Int. Cl. G01n 23/12
U.S. Cl. 250—43.5                    7 Claims This invention relates to distance measuring and more particularly to a method and apparatus for measuring distances such as altitudes or ranges by means of radiation techniques.

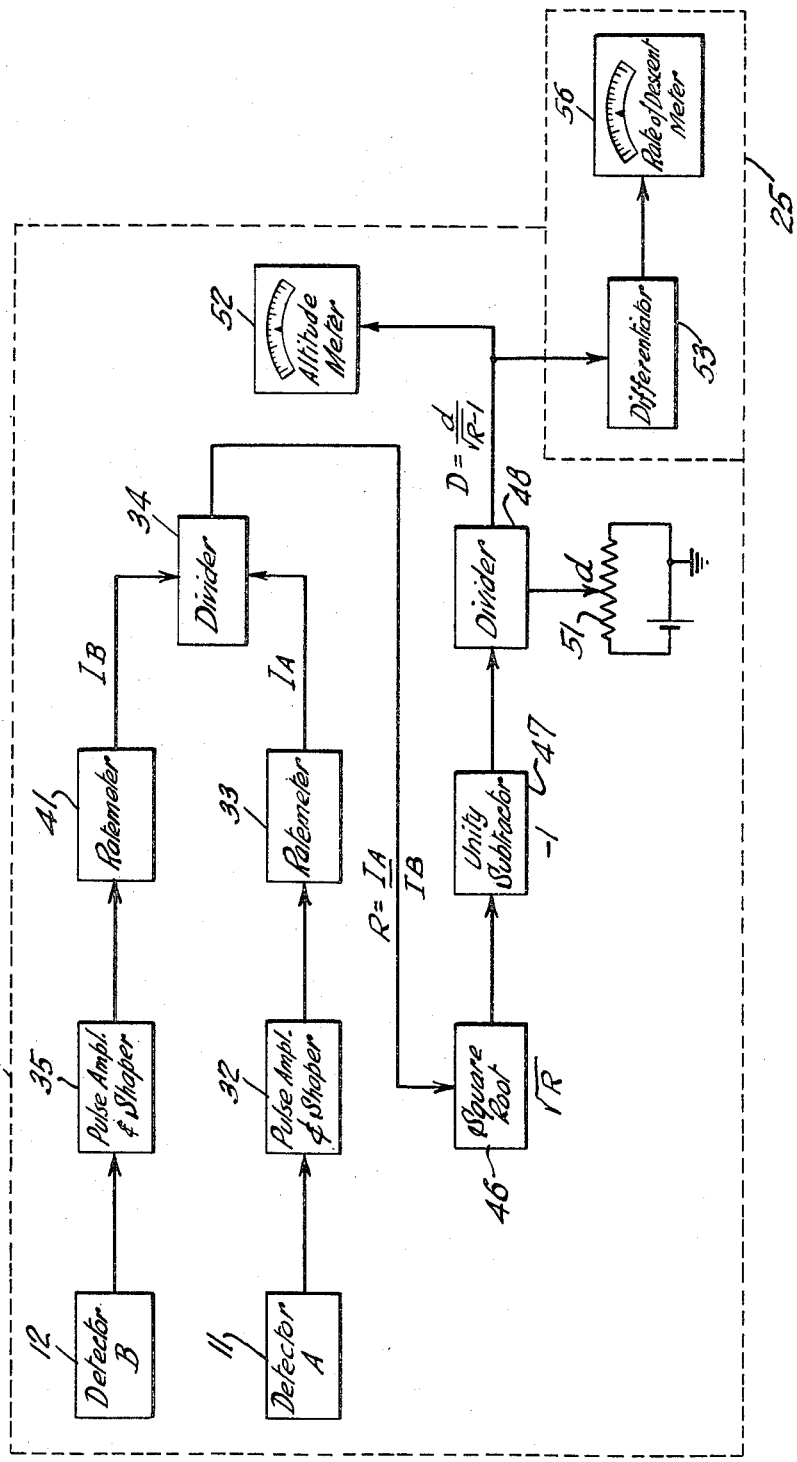

Considerable work has been done in the radiation prospecting field wherein sensitive detectors are located in a vehicle, such as an aircraft, where they measure the intensity of radiation reaching the detectors from ore bodies within the earth.. These detectors are sufficiently sensitive to detect very small differences in intensities of radiation received so that different types of deposits within the earth can be distinguished. It was recognized in this work, that the intensity measured at the radiation detectors is, of course, dependent on the proximity of the detectors to be radiating ore body, that is, dependent on the altitude of the aircraft carrying the detectors. Accordingly, it follows that if the intensity of the radiation source is known, the radiation detected at the radiation detectors in the aircraft is a function of altitude. It can be seen that such an altitude measuring arrangement would be dependent on knowning the intensity of the radiation source and would be in error if the radiation source should change in intensity. Also, any change in the medium through which the radiation is propagated would give rise to various effects such as absorption, scattering, etc., causing further error in any altitude measurements. Accordingly, radiation means of measuring altitude have not been popular.

The development of an altimeter whose operation was based on barometric pressure provided an accurate and easy means of measuring altitude in the earth's atmosphere. However, such an altimeter is not usable, for instance, in a different type of atmosphere or in the lack of an atmosphere as might be encountered in approching a different planet or a space station in orbit about the earth.

Another known means of measuring distance such as altitude or range is by use of conventional radar which measures the time elapsed between transmission and reception of a pulse after it has been reflected from a distant object. This method of distance measurement is effective in known atmospheres and also operates in the absence of an atmosphere. However, it has been difficult to obtain an accurate measurement with radar of distance at short ranges such as less than 200 feet since the transmitted pulses travel with the speed of light and hence the measurement of the difference in time between transmission and reception when the reflecting body is within such a short range is very difficult. Radar is also affected by the ionized gases from a rocket exhaust and measurements of distances thru the ionized sheath is subject to error. The present invention provides an altimeter which is not substantially affected by the atmosphere or lack of atmosphere and overcomes the defects noted above.

Accordingly, it is an object of the present invention to provide a method of measuring distance by a radiation technique wherein the distance measurement is not dependent on the absolute magnitude of the radiation detected, nor on the barometric pressure, nor on a time interval measurement.

It is another object of the invention to provide distance measuring apparatus utilizing a radiation technique which is capable of providing a continuous distance or altitude measurement independent of the absolute magnitude of the radiation source.

It is a further object of the present invention to provide distance measuring apparatus utilizing a radiation technique which continuously measures the rate of descent or closure of range between two objects.

It is still a further object of the present invention to provide distance measuring apparatus which utilizes a radiation technique and which provides a measurement of distance or altitude in various atmospheres or mediums through which the radiation is propagated.

According to one aspect of the invention, there is provided distance measuring apparatus for measuring the distance between two points such as the altitude of a spacecraft or aircraft from a landing surface comprising means for causing radiation to emanate from one of the points. A first detector is located at the other point for measuring the intensity of the radiation received from the radiating point and a second detector is spaced a known distance from the first detector and located substantialy on a line passing through the radiating point and the first detector but spaced a greater distance from the radiating point than the first detector. Means are provided for producing an output signal which varies in relation to the ratio of the radiation intensity measured by the first detector to the radiation intensity measured by the second detector. Means are also provided for producing an output signal which varies as a function of the ratio of received radiation intensities and of the predetermined distance between the first and second detectors, thereby to provide an output signal indicative of the distance between the two points, e.g., altitude of the spacecraft or aircraft.

Another important advantage of the invention is that the distance output signal may be differentiated with respect to time to give a signal ouput whose variation is a measurement of the rate of closure or rate of ascent or descent of the spacecraft or aircraft.

The invention will be described in more detail below with reference to the accompanying drawings wherein:

FIG. 3 is a more detailed block diagram of the altitude computer and rate of descent computer of FIG. 2.

Figure 1:
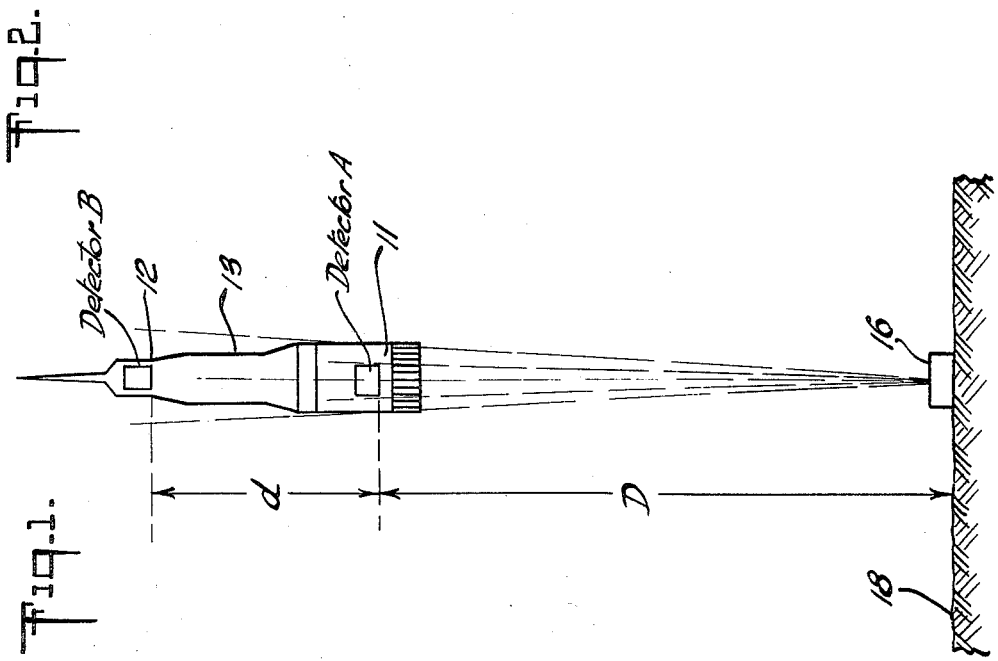
FIG. 1 is a schematic representation of an embodiment of the invention for measuring the altitude of a spacecraft from a surface and which shows the location of the detectors on the spacecraft with the radiation source located at the surface being approached.

Referring to FIG. 1, there is shown a first radiation detector 11 and a second radiation detector 12 spaced a known distance $d$ from each other and located on a line in the spacecraft 13 which passes through the source of radiation 16 on the surface being approached. The distance $d$ between radiation detectors 11 and 12 on the spacecraft 13 should be as long as is practical so as to obtain optimum accuracy at high altitudes.

The radiation detectors 11 and 12 can be collimated so as to receive radiation from substantially the same place on the surface being approached by the spacecraft 13 but this is not necessary if the background radiation is known. In FIG. 1, the radiation source 16 is shown located on the surface 18 of the body being approached. In measuring altitude with respect to a surface 18 such as the surface of the earth or moon, the radiation source 16 could be thrown from the spacecraft 13 while in the case, for example, of an orbiting space station which the spacecraft is approaching, the radiation source could be permanently located on the space station. The preferred source of radiation is a gamma or X-ray radiation although other types of radiation such as alpha and beta may be used under certain conditions. Radiation of the type emitted by the source as herein disclosed, e.g., gamma, X-ray, alpha and beta radiation, is hereinafter referred to as penetrative radiation.

The radiation detectors 11 and 12 my be of any conventional type such as Geiger-Mueller counters, ionization chambers, proportional counters, scintillation detectors or solid state radiation detectors. The choice will be dictated by the type and energy of the radiation source used and the maximum and minimum counting rate requirements.

The altimeter operation is based on a knowledge of the characteristic change in intensity with respect to distance of radiation passing through the medium between the radiation source 16 and the radiation detectors 11 and 12. Gamma radiation is known to vary in intensity inversely as the square of the distance from the source.

Assume the case where there is no atmosphere, such as might be encountered in landing on the moon, and knowing the distance $d$ between the two detectors; let the intensity of radiation in photons per unit area per unit time from the source reaching detector A be $I_A$; let the intensity of the radiation from the source reaching detector B be $I_B$; then the radiation intensity at detector A will be:

$$I_A = \frac{S}{4\pi D^2}$$

Where $S$=the source strength in photons per unit time and $D$=distance from the source to detector A.

The radiation intensity at detector B will be:

$$I_B = \frac{S}{4\pi(D+d)^2}$$

Solving these two equations for the altitude D:

$$I_B(D+d)^2 = I_A D^2$$
$$I_A/I_B = (D+d)^2/D^2$$
$$\sqrt{I_A/I_B} = (D+d)/D$$
$$= 1 + d/D$$
$$\sqrt{I_A/I_B} - 1 = d/D$$
$$D = d/(\sqrt{I_A/I_B} - 1)$$

This shows that the altitude D of the spacecraft 13 from the surface 18 is a function of the ratio $I_A/I_B$ of the intensities of radiation received at the two radiation detectors 11 and 12.

Accordingly, it can be seen that the altitude measurement is not dependent on the magnitude of the intensity of radiation of the source and that clouds of dust or other intervening material will have a negligible effect since the altitude determination is not based on the absolute intensity of the received radiation but is based on a ratio of intensities received at the two displaced radiation detectors 11 and 12. As long as any conditions affecting the intensities of the radiation received at both detectors affect those intensities proportionally, the ratio and thereby the resulting altitude measurements will be correct.

In most applications of the invention, it may be necessary to shield the detectors from background radiation such as cosmic rays. This shielding will not be necessary if the background radiation is known.

Figure 2:
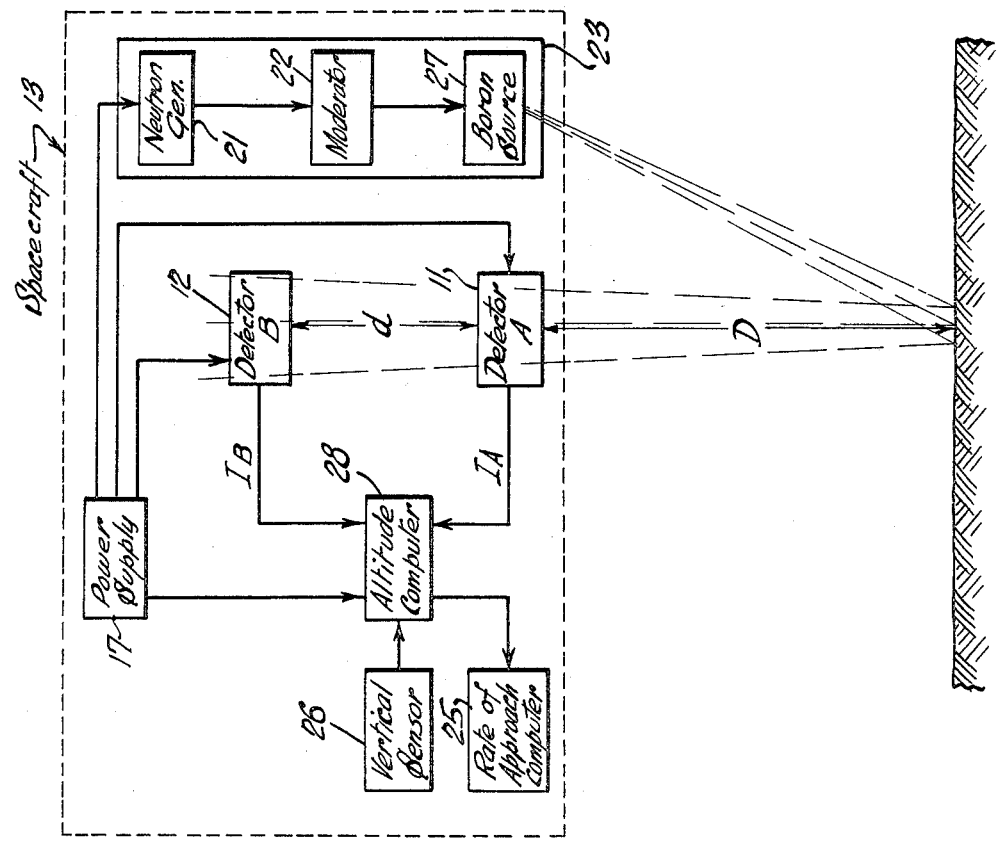
FIG. 2 is a partial schematic and block diagram of another embodiment of the altitude measuring apparatus showing the radiation source located on the spacecraft.

In FIG. 2 there is shown a modification of the arrangement of the altimeter apparatus as depicted in FIG. 1. Instead of having the radiation source 16 located on the surface 18 being approached, the radiation source 23 may be carried in the spacecraft 13 and may produce radiation which is scattered from the underlying surface 24 and detected by the pair of detectors as has been discussed above in connection with FIG. 1. The radiation source 23 as shown in FIG. 2 may consist of a radiation generator which may be employed in known manner to produce hard X-radiation (the equivalent to gamma radiation) rather than a radioactive isotope such as Cesium-137 or Cobalt-60.

Referring to FIG. 2, a power supply 17 is shown supplying the operating potential, such as 60 to 100 kv. which may be necessary to operate the radiation altimeter apparatus which includes a radiation generator. The necessary neutrons for operation of a radiation generator are produced in the neutron generator 21 by bombarding a suitable target with positive ions. The energy range of the neutrons produced may conventionally be from 2 to 14 mev., depending on the type of ions and the target used. The neutrons from the generator are moderated by a moderator 22 which contains a suitable material, such as carbon. Moderation of the neutrons causes them to lose energy and slow down, thus producing slow neutrons. The neutron moderator may be graphite, which as a low affinity for neutron capture but has high slowing down properties. Passing neutrons through the graphite slows them down. The required thickness of the graphite is determined by the initial energy of the neutrons entering the moderator, higher initial energies requiring thicker sections. The radiation is produced by source 27 consisting of a block of enriched boron which is 96% $B^{10}$. The slow neutrons directed into the block are easily captured, as the boron has a high cross-section for slow neutrons. When the neutrons are captured, two possible reactions take place:

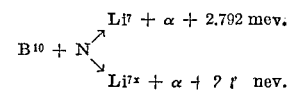

Approximately 94% of the reactions follow the lower reaction. The $Li^{7x}$ decays immediately ($7.7 \times 10^{-14}$ sec.) as shown by:

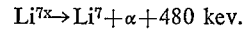

The unique gamma produced will have an energy of 480 kev. The radiation source 23 is not limited to the particular radiation generator described, and other reactions giving direct X-radiation may be utilized. It should also be noted that it may be desirable to collimate radiation source 23 so that the rays will impinge on a small area of the surface 24 being approached so as to cut down on the scattering area from which the radiation affecting detectors 11 and 12 emanates. This may be desirable if the landing area is very irregular.

The main advantage of using a radiation generator rather than a radioactive isotope for the radiation source is that the radiation can be switched on and off. This will cut down the danger to personnel since the radiation source will be activated only when needed, that is, in landing. Also, the measurement of background radiation can be made before the generator is activated, permitting a correction to be made and thus leading to a more accurate measurement of altitude. When the weight and power restrictions in the spacecraft preclude the use of a radiation generator, a radioactive isotope can be utilized using proper shielding. The shielding may be designed to provide an on-off switching control for the radiation, i.e., a shutter mechanism. This mechanism could be programmed such that a series of altitude and background measurements could be made.

A further feature of the invention shown in FIG. 2 is obtained by the rate of approach computer 25. As the name implies, the computer produces the rate of approach, e.g., closure or descent or ascent of the spacecraft 13 with respect to a surface 24. Letting the ratio of intensities $I_A/I_B=R$, and substituting R into the equation previously defined for the distance "D" we get $$D=d/(\sqrt{R}-1)$$

Taking the time derivative of D we obtain $dD/dt$ which is the change in distance with respect to time. This is equivalent to the velocity or rate of descent or ascent of the spacecraft. Further details of the mechanization of both the rate of approach computer 25 and the altitude computer 28 are given below.

It will be appreciated that an error is introduced if the spacecraft deviates from its present attitude when taking altitude measurements. In the arrangement depicted in FIG. 1, any variation of the spacecraft 13 from the vertical would produce an error since the radiation detectors 11 and 12 would no longer be located on a line which passes through both detectors and the source of radiation 16. The error which would be introduced would be in the distance $d$, the distance between the detectors 11 and 12. However, this error is rather small since the effective $d$ will be $d$ cosine $\alpha$, where $\alpha$ is the angle between the perpendicular and the longitudinal axis of the spacecraft.

In order to provide compensation for any deviation from the vertical, a vertical sensor 26 is provided. It is noted that most spacecrafts or aircrafts have such a unit already available which could be utilized. It is also noted that variations in the signls derived from the detectors due to misalignment of the detectors can be used to control the attitude of the craft.

Referring to FIG. 3, there is shown the details of mechanization of the distance computer 28 for solving the equation for obtaining D, the altitude above the surface 24, as well as the means for mechanizing the rate of approach computer 25. This mechanization consists of obtaining voltage signals representative of the two detector outputs $I_A$ and $I_B$ respectively, which can be done by the well known method of the counting rate meter, and consists further of performing mathematical operations upon these voltage signals. The mathematical operations required in the altitude determination are division, square root, and subtraction. The mathematical operation required in the rate of approach determination is a differentiation. All these operations may be performed electronically, for example, by operational amplifiers as set forth in Electronic Designer's Handbook by Landee, Davis and Albrecht published by McGraw Hill, 1957. The intensities $I_A$ and $I_B$ represent the intensity or number of pulses per unit time received from radiation detectors 11 and 12, respectively. The pulses from radiation detector A are amplified and shaped by a pulse amplifier and shaper 32 and fed to a conventional type ratemeter 33 which produces a DC voltage which varies as a function of the rate of occurrence or intensity of the input pulses. The ratemeter 33 includes an integrator, the time constant of which determines the time unit for determining the intensities. The output DC voltage from ratemeter 33 represents $I_A$ and forms a first input to a divider 34. Likewise, the pulses produced by detector 13 as a result of the photons of radiation received thereby, are amplified and shaped by pulse amplifier and shaper 35 and are fed to ratemeter 41 which corresponds to previously mentioned ratemeter 33. The DC voltage output of ratemeter 41 represents $I_B$ and forms a second input to divider 34. As mentioned previously, the distance D determination requires a knowledge of the value of $d$, the distance between the two radiation detectors 11 and 12, as well as the ratio of the radiation intensities measured at the radiation detectors 11 and 12. Accordingly, it is necessary to resolve the ratio. This is accomplished by divider 34 which divides the radiation intensity $I_A$ measured at radiation detector 11 by the radiation intensity $I_B$ measured at radiation detector 12. As can be seen, the output R from divider 34 when substituted for $I_A/I_B$ in the equation previously derived of "D" gives $D=d/(\sqrt{R}-1)$. This requires that the square root of R be taken. This is indicated in FIG. 3 by square root 46. Also, a subtractor 47 is provided to subtract unity (1) from the square root of R in accordance with the equation for D. The output signal from the subtractor 47 is fed to a divider 48 wherein a second input signal is introduced in the form of a voltage equivalent to $d$, the distance between the two detectors 11 and 12. The distance $d$ since it is known and non-varying can be easily introduced by the appropriate setting of a variable potentiometer 51. The divider 48 performs the division of the input signal $\sqrt{R}-1$ into $d$. The output signal from the divider 48 is the distance D or altitude of the spacecraft from the surface 24. This output signal may now be fed to a meter 52 which is calibrated to indicate altitude in feet.

The output voltage signal from the divider 48 which represents the altitude D may be differentiated by a differentiator 53 to obtain a signal representing the change in distance with respect to time $dD/dt$ which is the velocity of closure or rate of descent or ascent of the spacecraft 13. The output signal of differentiator 53 may be fed to a properly calibrated meter 56 to give a visual indication of the rate of approach.

Figure 4:
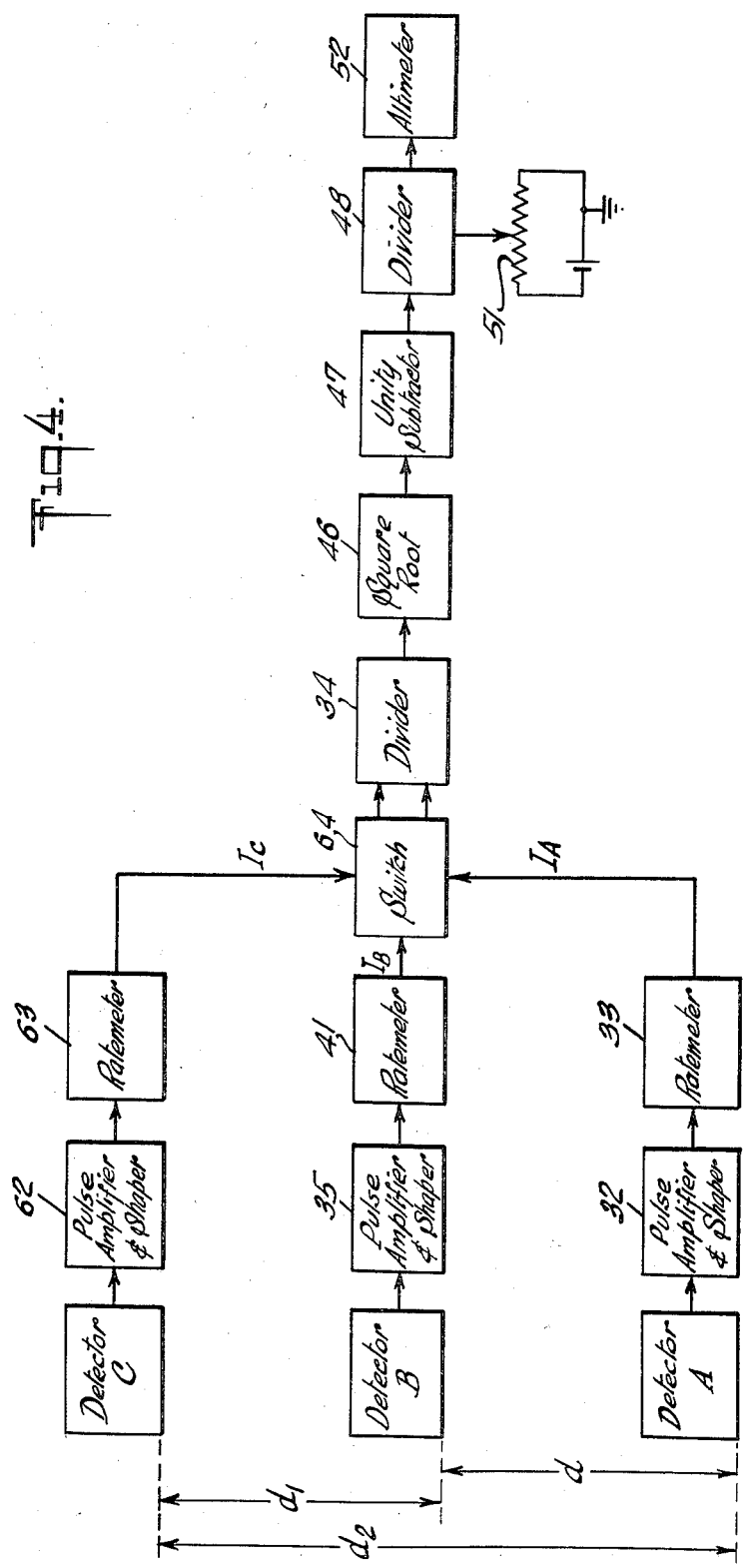
FIG. 4 is a block diagram of a further embodiment of the altitude computer showing a system arrangement having three detectors.

In FIG. 4 there is shown a system arrangement containing three detectors in which altitude can be computed using the ratio of intensities measured at any two of the detectors and the known distance between the two selected detectors. The blocks common to both FIGS. 3 and 4 are designated by the same reference numerals. The additional mechanization consists of an additional detector C, the associated pulse amplifier and shaper 62, ratemeter 63 and a multi-position switch 64. The switch 64, is capable of connecting any two of its three inputs to its two outputs. Accordingly the radiation intensity measured at any two detectors may be selected by means of switch 64 to enter into the altitude computation. It will be appreciated, however, that the corresponding predetermined value of $d$, the distance between selected detectors, will have to be introduced. This is easily accomplished by the correct adjustment of potentiometer 51. It will be noted that the measurement of D, altitude of the craft, is obtained with respect to the bottom detector of the pair. Thus, in the case of detectors B and C providing the intensity measurements for the altitude computation, a correction should be introduced to provide the measurement of D from the same point on the craft, i.e., detector A. The ability to switch between pairs of detectors having different spacings between each pair provides an increase in dynamic range of the system since it is advantageous to have a greater spacing between detectors when measuring long distances and to have a shorter spacing between detectors when measuring short distances. The three or more detector arrangement also provides a fail-safe and checking feature in that a different pair of detectors may be switched into operation to provide a check on the accuracy of the measurement or to provide a measurement when there has been a failure.

It will be appreciated that the embodiment of the invention shown in the drawings and described above is not limited to measurements of altitude but may also be used in measuring distance such as range. Of course, as mentioned previously, the measuremnts of distance are most accurate at short ranges, for example 200 feet or or under. The effective operational distance is dependent, of course, on the intensity of the radiation source and the sensitivity of the detectors used.

The characteristic change in intensity of radiation with distance follows the inverse-square-law, that is, the intensity of radiation decreases inversely as the square of the distance from the radiation source. However, the absorption characteristic of media other than a vacuum should be taken into consideration in the mechanization of the computer. The absorption co-efficient for vacuum is zero, for the earth's atmosphere is a little greater than zero (about 0.0001 cm.$^{-1}$ mev. gammas), and for water is approximately a thousand times as great as for the atmosphere.

The technique of using spaced detectors to obtain distance measurements is not limited to nuclear radiation but can be utilized with any type of signal wherein the signal strength varies as a known function of distance.

Obviously, many modifications and variations of the invention, as hereinbefore set forth, may be made without departing from the spirit and scope thereof, and therefore, only such limitations should be imposed as are indicated in the appended claims.

We claim:

1. Apparatus for measuring the distance between two points such as the altitude of a craft from a landing surface comprising a source of penetrative radiation for providing radiation emanating from one of said points toward the other of said points, a first radiation detector located at the other of the points for measuring the intensity of the radiation received from said one point, a second radiation detector spaced a known distance from said first detector and measuring the intensity of the radiation received from said one point, said second radiation detector being located substantially on a straight line passing through said one point and said first detector but spaced a greater distance from said one point than the spacing of said first detector from said one point, ratio measuring means connected to each of said radiation detectors for producing a signal proportional to the ratio of the radiation intensities measured at said first and second radiation detectors, signal generating means for introducing a signal proportional to the distance between said first and second radiation detectors, computer means connected to said ratio measuring means for receiving said signal proportional to said ratio and connected to said signal generating means for introducing a signal proportional to said distance between said first and second detectors, said computer means providing an output signal which varies as a function of the ratio signal and the distance signal between said detectors, said output signal being proportional to the distance between said one point and the radiation detector at said other point, said apparatus further comprising differentiation means for differentiating the output signal from said computer means with respect to time, in order to provide a signal proportional to the rate of change of distance with respect to time.

2. A distance measuring apparatus according to claim 1, wherein said computer means comprises a square root means for producing a signal proportional to the square root of said ratio of intensities signal, a unity subtractor connected to said square root means for subtracting a unity value from said square root proportional signal and a divider connected to said unity subtractor for receiving the square root of the ratio signal less unity from the unity subtractor means and dividing it into the signal proportional to the distance between said first and second detectors to produce said output signal proportional to the distance from said one point to said first radiation detector.

3. Distance measuring apparatus according to claim 1, wherein said source of radiation is located at said one of said points.

4. Distance measuring apparatus according to claim 3, wherein said source of radiation is a gamma source.

5. Distance measuring apparatus for measuring the distance between two points such as the altitude of a craft from a landing surface, comprising a source of penetrative radiation located at a first point and adapted to beam radiation toward a second point, said radiation being reflected from said second point, a first radiation detector located adjacent said first point for measuring the intensity of radiation reflected from said second point, a second radiation detector spaced a predetermined distance from said first detector for measuring the intensity of the radiation received from said second point, said second radiation detector being located substantially on a line passing through said first detector and said second point from which the radiation is reflected but located at a greater distance from said second point than the first detector is located from said second point, ratio measuring means, connected to each of said radiation detectors for producing an output signal proportional to the ratio of the radiation intensities measured by said first and second radiation detectors, a computer means connected to said ratio measuring means, said computer means comprising a square root means for producing a signal proportional to the square root of said ratio of intensities signals, a unity subtractor connected to said square root means for subtracting unity from said square root proportional signal, signal generating means for providing a signal proportional to the distance between said first and second detectors, and a divider connected to said unity subtractor and said signal generating means dividing the square root of the ratio signal less unity into the signal proportional to the distance between said first and second detectors to produce an output signal proportional to the distance between said radiation reflecting second point and said first radiation detector.

6. Distance measuring apparatus according to claim 5, wherein said source of radiation located at a first point comprises a radiation generator.

7. Distance measuring apparatus according to claim 5, further comprising differentiation means for differentiating the output signal from said divider with respect to time, in order to provide a signal proportional to the rate of change of distance with respect to time.

References Cited

UNITED STATES PATENTS

| | | | |
|---|---|---|---|
| 2,206,036 | 7/1940 | Herson | 340—26 X |
| 2,369,659 | 2/1945 | Carr | 324—70 |
| 2,841,713 | 7/1958 | Howard | 250—83.3 X |
| 2,922,888 | 1/1960 | Faulkner et al. | 250—83.6 |
| 3,036,219 | 5/1962 | Thomson | 250—211 X |
| 3,202,822 | 8/1965 | Kehler | 250—83.3 |
| 3,134,104 | 5/1964 | Murphee et al. | 340—16 X |

ARCHIE R. BORCHELT, Primary Examiner

U.S. Cl. X.R.

250—83.3; 343—12